(12) United States Patent
Crosland et al.

(10) Patent No.: US 9,082,199 B1
(45) Date of Patent: Jul. 14, 2015

(54) VIDEO PROCESSING ARCHITECTURE

(75) Inventors: Andrew Crosland, Aylesbury (GB);
Roger May, Bicester (GB)

(73) Assignee: Altera Corporation, San Jose, CA (US)

( * ) Notice: Subject to any disclaimer, the term of this patent is extended or adjusted under 35 U.S.C. 154(b) by 1449 days.

(21) Appl. No.: 11/440,502

(22) Filed: May 24, 2006

Related U.S. Application Data

(60) Provisional application No. 60/700,044, filed on Jul. 14, 2005.

(51) Int. Cl.
*G06T 3/40* (2006.01)
*H04N 5/343* (2011.01)

(52) U.S. Cl.
CPC . *G06T 3/40* (2013.01); *H04N 5/343* (2013.01)

(58) Field of Classification Search
USPC .................................... 348/536; 345/531, 76
See application file for complete search history.

(56) References Cited

U.S. PATENT DOCUMENTS

| 5,787,199 | A  | * | 7/1998  | Lee           | 382/203 |
| 5,907,640 | A  | * | 5/1999  | Delean        | 382/276 |
| 6,593,930 | B1 | * | 7/2003  | Sheaffer et al. | 345/531 |
| 2001/0019365 | A1 | * | 9/2001  | Kim et al.    | 348/554 |
| 2002/0021364 | A1 | * | 2/2002  | Asada et al.  | 348/312 |
| 2002/0054064 | A1 | * | 5/2002  | Argabright et al. | 345/716 |
| 2004/0095508 | A1 | * | 5/2004  | Chida         | 348/458 |
| 2005/0213830 | A1 | * | 9/2005  | Nagashima     | 382/239 |
| 2005/0219163 | A1 | * | 10/2005 | Smith et al.  | 345/76  |
| 2006/0017847 | A1 | * | 1/2006  | Tardif        | 348/536 |
| 2006/0020894 | A1 | * | 1/2006  | Ejima et al.  | 715/721 |
| 2006/0061687 | A1 | * | 3/2006  | Dunton        | 348/564 |

\* cited by examiner

*Primary Examiner* — Phi Hoang
(74) *Attorney, Agent, or Firm* — Ropes & Gray LLP

(57) ABSTRACT

A video processing device has an input for receiving video data, at least one processing circuit, for generating processed video data from the received video data, and a memory, for receiving the processed video data. An output circuit reads the processed video data from the memory, and generates frames of data including at least the processed video data. In order to be able to operate with an output clock frequency that may differ from the ideal output clock frequency, it is possible to vary the frame size, that is, the number of pixels of data in a frame. If an amount of processed video data stored in the memory exceeds an upper threshold, then the frame size can be reduced by reducing the number of pixels of blanking data in the output frame, thereby increasing the rate at which data is read from the memory. Conversely, if an amount of processed video data stored in the memory is lower than a lower threshold, then the frame size can be increased by increasing the number of pixels of blanking data in the output frame, thereby reducing the rate at which data is read from the memory.

16 Claims, 2 Drawing Sheets

VIDEO PROCESSING ARCHITECTURE

BACKGROUND OF THE INVENTION

This invention relates to a device and a method for processing input video signals. In particular, the invention relates to a device and a method that allow processing of input video signals, without requiring large amounts of memory for storing the video data.

In many applications, it is required to process video data before displaying it on a display device. For example, the video data may be live data received from a camera, or may be previously recorded data, received from a DVD player or other source. It may then for example be required to display the received video data in a different format, or with a different image superimposed on the image represented by the received data.

Such processing can for example be carried out by storing the received video data and/or the processed video data in a buffer memory that may for example be able to store one or more frames of video data.

It is desirable to be able to use Field Programmable Gate Array (FPGA) devices for many applications, because they allow products to be designed and manufactured in a highly cost effective way. However, FPGA devices typically do not include sufficient memory resources to be able to store multiple frames of video data, and it is preferable to be able to avoid the need to access a separate memory device to store the received video data and/or the processed video data.

SUMMARY OF THE INVENTION

According to an aspect of the present invention, a video processing device has an input for receiving video data, at least one processing circuit, for generating processed video data from the received video data, and a memory, for receiving the processed video data. An output circuit reads the processed video data from the memory, and generates frames of data including at least the processed video data. In order to be able to operate with an output clock frequency that may differ from the ideal output clock frequency, it is possible to vary the frame size, that is, the number of pixels of data in a frame.

According to a second aspect of the present invention, if an amount of processed video data stored in the memory exceeds an upper threshold, then the frame size can be reduced by reducing the number of pixels of blanking data in the output frame, thereby increasing the rate at which data is read from the memory. Conversely, if an amount of processed video data stored in the memory is lower than a lower threshold, then the frame size can be increased by increasing the number of pixels of blanking data in the output frame, thereby reducing the rate at which data is read from the memory.

DETAILED DESCRIPTION OF PREFERRED EMBODIMENTS

Figure 1:
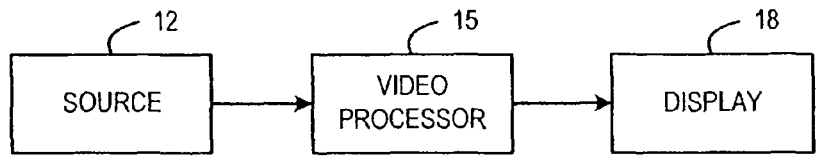
FIG. 1 is a block schematic diagram of a video display system in accordance with an aspect of the present invention.

FIG. 1 shows a video display system 10. Specifically, the video display system 10 includes a source device 12, which generates video data. For example, the source device 12 may be a camera, a television receiver, a DVD player, or any other device that produces a video signal as an output.

The video data from the source device 12 is applied to a video processing device 15. As will be described in more detail below, the video processing device 15 processes the received video data, such that it generates output video data in a form that is required for subsequent display. For example, the video processing device may make adjustments to the format of the video data, or may superimpose text or a different image over a part of the image represented by the video data.

The output video data from the video processing device 15 is supplied to a display device 18. The display device 18 can take any convenient form, and may for example be a VGA display. The form of the display device 18 may affect the required form of the video data supplied from the video processing device 15. For example, the video data supplied from the video processing device 15 must be supplied in a form that is consistent with the size and the aspect ratio of the display device 18.

Figure 2:
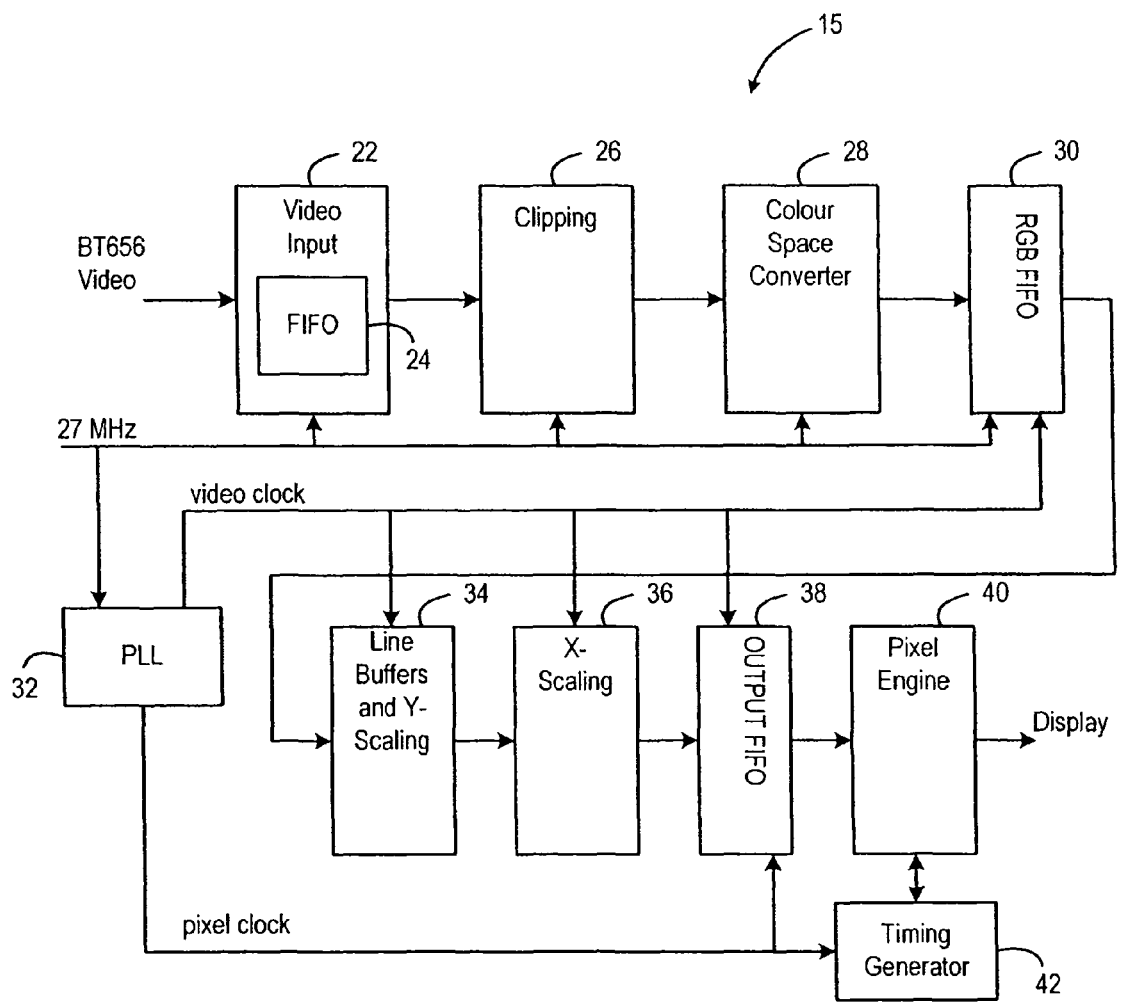
FIG. 2 is a block schematic diagram of a video processing device in accordance with the present invention.

FIG. 2 is a more detailed block diagram, illustrating the form of the video processing device 15. In the illustrated embodiment, the video processing device 15 is implemented in a FPGA device, for example a Cyclone® FPGA available from Altera Corporation.

The video processing device 15 includes a video input device 22, in this illustrated embodiment adapted to receive video data in a format defined by the BT656 standard at 27 MHz, although it will be appreciated that data could also be received in other formats. According to the BT656 standard, a frame of video data is made up of two fields, and each of these fields includes a number of lines of data. Each field includes a number of lines forming a top blanking period, a number of lines of active video data, and a number of lines forming a bottom blanking period. Within each line, there is the active video data, blanking video data, and codes indicating the start and the end of the active video data. The active video data includes bytes of data representing the luminance (Y), blue chrominance (Cb) and red chrominance (Cr) of the image for each pixel.

The video input device 22 stores the received input video data in a FIFO 24, and decodes the data to extract timing information for horizontal and vertical frame synchronization and for the horizontal and vertical blanking periods.

The decoded video data is applied to a clipping module 26, which allows the whole, or only one or more portions, of each frame to be selected.

The decoded video data after possible clipping is applied to a colour space converter 28, which in the illustrated embodiment of the invention converts the video data from the Y, Cb, Cr format into a RGB (red, green, blue) encoded format. The RGB data are then stored in a RGB FIFO 30. In this illustrated embodiment, where the video processing device 15 is implemented in a FPGA device, for example a Cyclone® FPGA available from Altera Corporation or another comparable FPGA device, the RGB FIFO 30 can be implemented using the memory resources of the FPGA device itself.

As mentioned above, the received video data, according to the BT656 standard, are received at 27 MHz, and so the received data is clocked through the video input device 22, the FIFO 24, the clipping module 26, and the colour space converter 28, and into the RGB FIFO 30 at 27 MHz.

The 27 MHz signal is supplied as an input to a phase-locked loop (PLL) 32. As is well known, the PLL 32 takes an input signal at a reference frequency, in this case the 27 MHz signal mentioned above, and is then able to generate one or more output signals at different frequencies. The frequencies of the output signals are derived from the frequency of the input signal, in that the frequency of the input signal is divided by a first divider parameter and is then multiplied by a second multiplier parameter. The values of the first divider parameter and the second multiplier parameter can be selected from a number of available integer values. One consequence of this is that, for a given reference frequency, there are a finite number of output signal frequencies that can be generated.

In this case, an output video clock signal is generated. The RGB data are then read out of the FIFO 30 at the video clock rate, and applied to a line buffers and Y-scaling module 34. Two complete lines of video data are stored in this module 34, and any required scaling of the image in the Y-direction (that is, vertically) is performed. In this illustrated embodiment, where the video processing device 15 is implemented in a FPGA device, for example a Cyclone® FPGA available from Altera Corporation or another comparable FPGA device, the line buffers can be implemented using the memory resources of the FPGA device itself.

Then, if the number of lines per frame required for display in the display device 18 differs from the number of lines in each frame of the input video data, the module 34 can interpolate between the stored lines of data, in order to generate the required data. This can then allow for enlargement or shrinking of the image in the Y-direction, if required. The frequency of the output video clock signal must be made high enough that interpolated lines of data can be generated, without causing the RGB FIFO 30 to overflow.

The Y-scaled data is then applied to an X-scaling module 36. The X-scaling module 36 performs any necessary interpolation between pixels within each line, in order to achieve any desired image scaling in the X-direction (that is, horizontally).

The processed video data is then stored in an output FIFO memory 38. In this illustrated embodiment, where the video processing device 15 is implemented in a FPGA device, for example a Cyclone® FPGA available from Altera Corporation or another comparable FPGA device, the FIFO memory 38 can be implemented using the memory resources of the FPGA device itself.

In this illustrated embodiment of the invention, the received video data has been subject to various processing stages, as described above. However, it will be apparent to the person skilled in the art that, in other embodiments of the invention, other processing stages may be provided, and any or all of the processing stages described above may be omitted.

Data is read out of the output FIFO 38 by a pixel engine 40, which generates frames of video data, in a format suitable for the display device 18. For example, the pixel engine adds to the processed video data the required synchronization and blanking signals.

The data is read out of the output FIFO 38 at the frequency of a pixel clock, which is generated by the PLL 32, and supplied to the output FIFO 38 and to the pixel engine 40 through a timing generator 42.

The pixel clock must be set to a frequency that is suitable for the display 18, namely that causes the data to be read out of the output FIFO 38 and supplied to the display 18 at the required data rate. If the pixel clock is set too slow, then data will arrive at the output FIFO 38 faster than it is being read out, and the output FIFO 38 will become full, and unable to store the processed video data. If the pixel clock is set too fast, the output FIFO 38 will not be able to supply the data to the display 18 at the required rate.

However, the fact that the pixel clock is derived from the clock signal of the video data source, at 27 MHz, places limitations on the pixel clock values that can be achieved.

Figure 3:
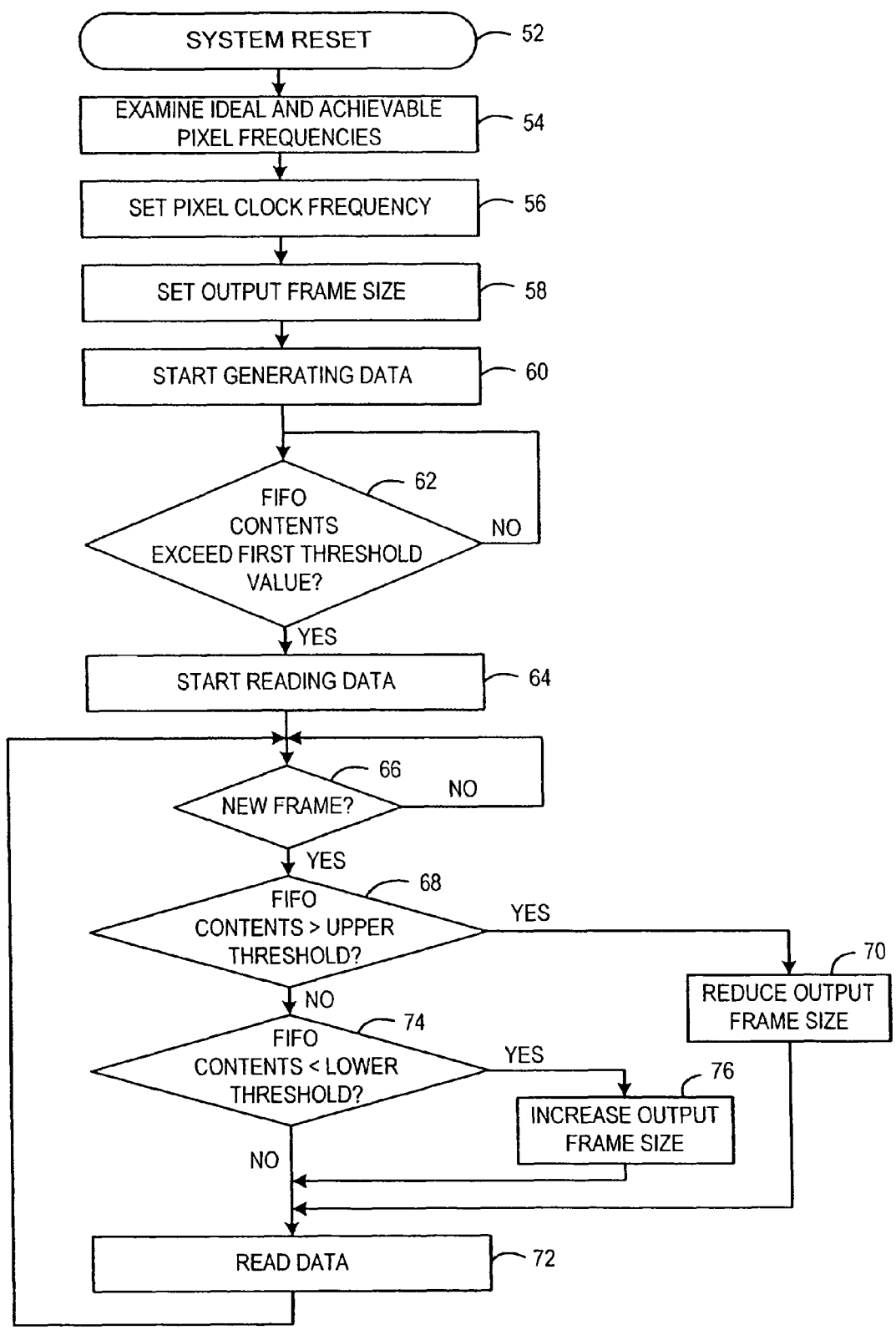
FIG. 3 is a flow chart illustrating a method of operation of the video processing device in accordance with the present invention.

FIG. 3 is a flow chart, illustrating a method in accordance with the present invention. The process begins at step 52, when the system is reset. In step 54, the ideal and the achievable pixel clock frequencies are considered.

The ideal pixel clock frequency is determined by the properties of the display device 18. That is, in the case of an LCD panel with an active display area of 800×480 pixels, but a total size including blanking of 1056×524 pixels, and with a refresh rate of 60 frames per second, the ideal pixel clock is 1056×524×60 or 33.200640 MHz.

However, it is unlikely that the PLL 32 will be able to generate a clock signal at exactly that frequency, based on the available input frequency. In the case of the Cyclone® FPGA, available from Altera Corporation, in which the present invention may be implemented, with an input clock frequency of 27 MHz, the PLL 32 can generate a number of possible clock signal frequencies in the region around this ideal pixel clock frequency. Specifically, the PLL 32 can generate clock signals at the frequencies 33.136364 MHz, 33.230769 MHz and 33.352941 MHz.

In step 56, one of these possible frequencies is set as the pixel clock frequency. Specifically, in this illustrated embodiment, the frequency of 33.230769 MHz is set as the pixel clock frequency, as this is the closest of the possible frequencies to the ideal pixel clock frequency.

It will be noted that, in this case, the selected pixel clock frequency is slightly faster than the ideal pixel clock frequency. The result of this would be that, reading data out of the FIFO memory at this frequency, the pixel engine would generate a complete frame of 553344 pixels in the same time that it would generate only 552842 pixels at the ideal pixel clock frequency, a difference of 501 pixels.

In step 58, a static adjustment is made to the output frame size, in order to reduce as far as possible this discrepancy. In this case, it is noted that, by increasing the frame size to 1057×524 pixels, an additional 524 pixels are required in each frame. The result is that, at this frequency, the pixel engine would generate a complete frame of 553868 pixels (including data read out of the FIFO memory and additional blanking data) in the same time that it would generate 553365 pixels at the ideal pixel clock frequency, and this latter figure differs by only 21 pixels from the number of pixels in the nominal 1056×524 frame. The result is that the difference between the actual frame rate (resulting from the selected pixel clock frequency and the selected output frame size) and the ideal frame rate has been minimized.

In step 60, the video processor 15 is started, and receives input video data, which it processes as described above, in order to generate processed video data. The processed video data is then stored in the output FIFO 38 until it is read by the pixel engine 40 and supplied to the display device 18. One of the advantages of the present invention is that, by closely aligning the actual frame rate and the ideal frame rate, the required size of the output FIFO 38 is reduced, although it will always be necessary to buffer a certain minimum amount of data in the output FIFO 38, in order to be able to deal with possible fluctuations in the rate at which processed video data is received in the output FIFO 38.

In this embodiment of the invention, three threshold values are set, against which the amount of data stored in the output FIFO 38 can be compared. In step 62 of the process, the amount of data stored in the output FIFO 38 is compared with a first threshold value, and this step is repeated until the amount of stored data reaches this first threshold. The first threshold value is set so that this occurs part of the way along the first active line of the first frame of data.

When it is determined in step 62 that the first threshold has been reached, the pixel engine 40 starts in step 64 to read the data out of the output FIFO 38. While the data is being read out of the output FIFO 38, it is being tested in step 66 whether a new output frame has been reached.

When it is determined in step 66 that a new output frame is starting, the process passes to step 68, in which the amount of data stored in the output FIFO 38 is compared with a second threshold value, this second threshold value acting as an upper threshold, and being higher than the first threshold value.

If it is determined in step 68 that the amount of data stored in the output FIFO 38 exceeds the second threshold value, this indicates that data is being read out of the output FIFO 38 more slowly than it is being generated. In this case, the process passes to step 70, in which the rate at which data is read out of the output FIFO 38 is increased, by reducing the output frame size.

Specifically, the output frame size can be reduced by shortening one or more of the lines of the display during the horizontal and/or vertical blanking periods.

The process then passes to step 72, in which the data is read from the output FIFO 38, in order to generate a frame of the reduced size, while the process is also performing step 66, in which it is testing whether the start of a new frame has been reached.

If it is determined in step 68 that the amount of data stored in the output FIFO 38 does not exceed the second threshold value, the process passes to step 74, in which the amount of data stored in the output FIFO 38 is compared with a third threshold value, this third threshold value acting as a lower threshold, and being lower than the first threshold value.

If it is determined in step 74 that the amount of data stored in the output FIFO 38 is lower than the third threshold value, this indicates that data is being read out of the output FIFO 38 more quickly than it is being generated. In this case, the process passes to step 76, in which the rate at which data is read out of the output FIFO 38 is reduced, by increasing the output frame size.

Specifically, the output frame size can be increased by lengthening one or more of the lines of the display during the horizontal and/or vertical blanking periods.

The process then passes to step 72, in which the data is read from the output FIFO 38, in order to generate a frame of the increased size, while the process is also performing step 66, in which it is testing whether the start of a new frame has been reached.

If it is instead determined in step 74 that the amount of data stored in the output FIFO 38 is not lower than the third threshold value, there is no change in the rate at which data is read out of the output FIFO 38 but, again, the process passes to step 76, in which the rate at which data continues to be read out of the output FIFO 38, while the process is also performing step 66, in which it is testing whether the start of a new frame has been reached.

Thus, in steps 70 and 76, the process makes an adjustment to the output frame size, by adding or subtracting pixels, not intended for display, from the generated frame. In this illustrated embodiment, the adjustment is of a predetermined fixed size. For example, the lengths of ten of the horizontal lines during the vertical blanking periods could each be reduced or increased, as the case may be, by one pixel. However, an alternative embodiment is possible, where the size of the adjustment could vary, for example based on the amount by which the amount of data stored in the output FIFO 38 exceeds, or is lower than, the relevant threshold value.

In this illustrated embodiment, any adjustment to the output frame size is effective only for the frame in which it is determined that the amount of data stored in the output FIFO 38 exceeds, or is lower than, the relevant threshold value. However, an alternative embodiment is possible, where any adjustment could remain in place for future frames until it is next determined that the amount of data stored in the output FIFO 38 exceeds, or is lower than, the relevant threshold value.

In this illustrated embodiment, it is determined in each frame whether the amount of data stored in the output FIFO 38 falls within the two threshold values. Where the output FIFO 38 is sufficiently large, errors could be allowed to accumulate for a longer period. For example, it may only be determined in alternate frames whether the amount of data stored in the output FIFO 38 falls within the two threshold values. Also, where the output FIFO 38 is sufficiently large, errors could be allowed to accumulate for a longer period, until a relatively large adjustment is needed. For example, errors could be allowed to accumulate until such time as the adjustment can take the form of an increase or a reduction of one pixel in each horizontal line of the frame.

There are therefore disclosed a video processing device, and a method of operation of a video processing device, that allow the video processing device to be implemented without requiring a large buffer memory. Specifically, where the device is implemented in a suitable FPGA device, all of the FIFOs and line buffers can use internal memory resources available in the FPGA device itself.

The invention claimed is:

1. A video processing device, comprising:
an input for receiving video data;
at least one processing circuit for processing the received video data to produce processed video data;
a memory for storing the processed video data; and
an output circuit for:
reading the processed video data from the memory;
writing the processed video data to a data frame; and
dynamically reducing, during the writing of the processed video data to the data frame, a horizontal or vertical length of the data frame during a vertical blanking period associated with the data frame in response to a determination that a number of pixels of the processed video data stored in the memory exceeds an upper threshold value of a total number of pixels.

2. A video processing device as claimed in claim 1, wherein a number of pixels of blanking data in the data frame is varied in response to a read rate of the memory.

3. A video processing device as claimed in claim 2, wherein the number of pixels of blanking data in the data frame is varied by varying a number of pixels of blanking data in at least one line of the data frame.

4. A video processing device as claimed in claim 2, wherein the number of pixels of blanking data in the data frame is varied by varying a number of lines of blanking data in the data frame.

5. A video processing device as claimed in claim 1, wherein the number of pixels of processed video data stored in the memory is compared with at least one lower threshold value and wherein the number of pixels of data in the data frame is increased in response to determining that the number of pixels of processed video data stored in the memory is less than a lower threshold value.

6. A video processing device as claimed in claim 1, further comprising a timing generator.

7. A video processing device as claimed in claim 6, wherein the timing generator is operable to set a rate at which the output circuit reads the processed video data from the memory.

8. A video processing device as claimed in claim 6, wherein the timing generator is coupled to a phase-locked loop to receive a clock signal therefrom.

9. A video processing device as claimed in claim 8, wherein a frequency of the clock signal is set to approximate an ideal clock frequency in response to a nominal display size and a data frame refresh rate.

10. A video processing device as claimed in claim 9, wherein the frequency of the clock signal approximates a target frame rate based on a nominal output display size and the ideal clock frequency.

11. A method of generating video data, the method comprising:
receiving input video data;
processing the received input video data to produce processed video data;
writing the processed video data to a data frame at a pixel clock rate, wherein an initial size of the data frame is determined in response to an initial number of pixels of the processed video data stored in a memory; and
dynamically reducing, during the writing of the processed video data to the data frame, the size of the data frame during a vertical blanking period associated with the data frame based on a determination that the number of pixels of the processed video data stored in the memory exceeds an upper threshold value of a total number of pixels.

12. A method as claimed in claim 11, wherein a number of pixels of blanking data in a data frame is varied in response to a read rate of the memory.

13. A method as claimed in claim 11, wherein a number of pixels of blanking data in a data frame is varied by varying a number of lines of blanking data in the data frame.

14. A method as claimed in claim 11, further comprising dynamically increasing, during the writing of the processed video data to the data frame, the size of the data frame if the number of pixels of the processed video data stored in the memory is less than a lower threshold number.

15. A Field Programmable Gate Array device comprising:
an input for receiving video data;
at least one processing circuit for producing processed video data from the received video data;
a memory for storing the processed video data, the memory implemented in memory resources of the Field Programmable Gate Array device;
an output circuit for reading the processed video data from the memory and writing the processed video data to a data frame, wherein an initial size of the data frame is determined in response to an initial number of pixels of processed video data stored in memory; and
a frame adjustment circuit for dynamically reducing, during the writing of the processed video data to the data frame, the size of the data frame during a vertical blanking period associated with the data frame in response to a determination that the number of pixels of the processed video data stored in the memory exceeds an upper threshold value of a total number of pixels.

16. The Field Programmable Gate Array device of claim 15, wherein the frame adjustment circuit dynamically increases, during the writing of the processed video data to the data frame, the size of the data frame in response to a determination that the number of pixels of the processed video data stored in the memory is less than a lower threshold value.

* * * * *